June 21, 1955   H. L. KAHLER   2,711,391
PHOSPHATE-CHROMATE CORROSION PROTECTION IN WATER SYSTEMS
Filed June 29, 1953   6 Sheets-Sheet 5

INVENTOR
Harry Lewis Kahler.
BY
ATTORNEYS.

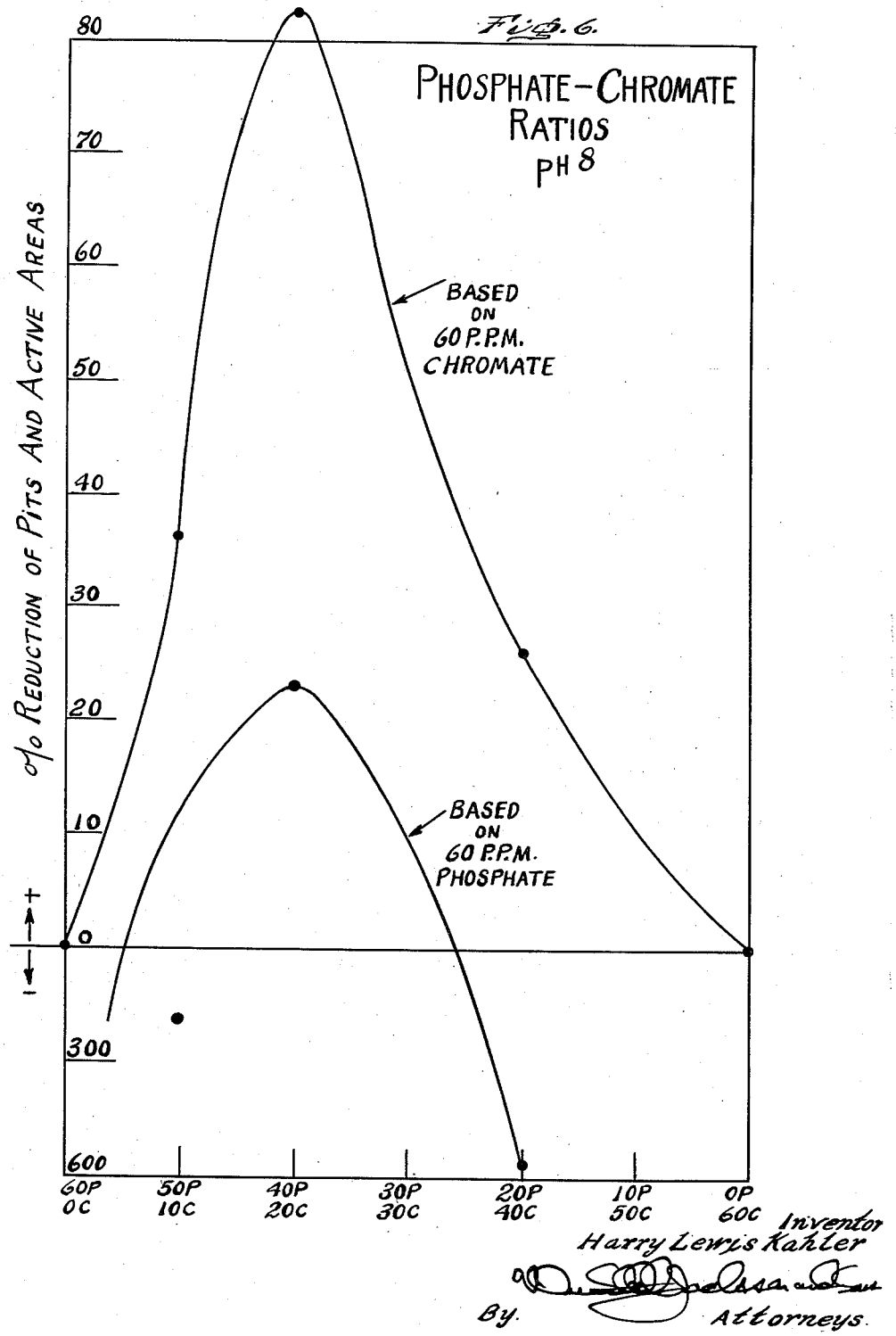

United States Patent Office 2,711,391
Patented June 21, 1955

2,711,391

PHOSPHATE-CHROMATE CORROSION PROTECTION IN WATER SYSTEMS

Harry Lewis Kahler, Feasterville, Pa., assignor to W. H. & L. D. Betz, Philadelphia, Pa., a partnership Application June 29, 1953, Serial No. 364,871

11 Claims. (Cl. 210—23)

The present invention relates to the treatment of water to minimize pitting and tuberculation, particularly in industrial water systems.

The present application is a continuation-in-part of my copending application Serial No. 145,988, filed February 24, 1950, for Corrosion Protection in Water Systems, now abandoned.

A purpose of the invention is to decrease the amount of corrosion of metal parts such as piping by industrial waters used in heat transfer and for similar purposes, and especially to reduce the pitting and tuberculation of iron base alloys such as steel, copper base alloys such as copper and brass, and aluminum alloys.

A further purpose is to combine anodic treatments of water to obtain an effect in the prevention of pitting and tuberculation which neither alone is capable of producing.

A further purpose is to regulate the pH of the water to from 5.25 to 7.8, preferably from 5.5 to 7.8 and most desirably from 5.8 to 7.4, to incorporate a water soluble, chromate, preferably an alkali metal chromate, in a concentration of 5 to 188 p. p. m., preferably 11 to 50 p. p. m. and most desirably 15 to 25 p. p. m. and to incorporate a water soluble phosphate, preferably an alkali metal phosphate and preferably a molecularly dehydrated phosphate, in a concentration of 11 to 194 p. p. m., preferably 15 to 100 p. p. m. and most desirably 30 to 50 p. p. m., the total chromate plus phosphate being in the range from 16 to 199 p. p. m., preferably 26 to 150, and most desirably from 45 to 75 p. p. m.

A further purpose is to obtain maximum effectiveness in the prevention of pitting and tuberculation while economizing on the quantities of water treatment chemicals. In achieving this purpose, the proper pH range is selected along with alkali metal chromate or dichromate in the range from 11 to 50 p. p. m., and alkali metal ortho-phosphate or molecularly dehydrated phosphate in the range between 15 and 100 p. p. m., the total concentration of both being in the range of 26 to 150 p. p. m.

A further purpose is to introduce the chromate and the phosphate from a single briquette which is preferably substantially entirely chromate and phosphate, and in which the lesser of the two ingredients is at least 5% of the total phosphate and chromate, in addition to any binder.

A further purpose is to obtain superior protective treatment or to prevent pitting and tuberculation under high corrosion loads by higher concentrations of chemicals where economy is not the prime factor, employing, in the regulated pH ranges as above discussed, alkali metal chromate or dichromate in a concentration range of 50 to 99 p. p. m. and alkali metal ortho-phosphate or molecularly dehydrated phosphate in a concentration range of 50 to 100 p. p. m., the total concentration of both being between 100 and 199 p. p. m.

Further purposes appear in the specification and in the claims.

The application is directed to the process of treating the water and to the treated water.

The drawings show curves useful in explaining the invention.

Figure 1 compares the reduction in pits and active areas by the phosphate-chromate treatment of the invention with that obtained from chromate alone, and plots the percentage reduction of pits and active areas as ordinates plus or minus against the pH as abscissae.

Figures 4, 5 and 6 show the effective ranges of phosphate-chromate ratios respectively at pH 6, 7 and 8, and plot the percentage reduction of pits and active areas as ordinates against the ratios of phosphate to chromate as abscissae.

Figure 1:
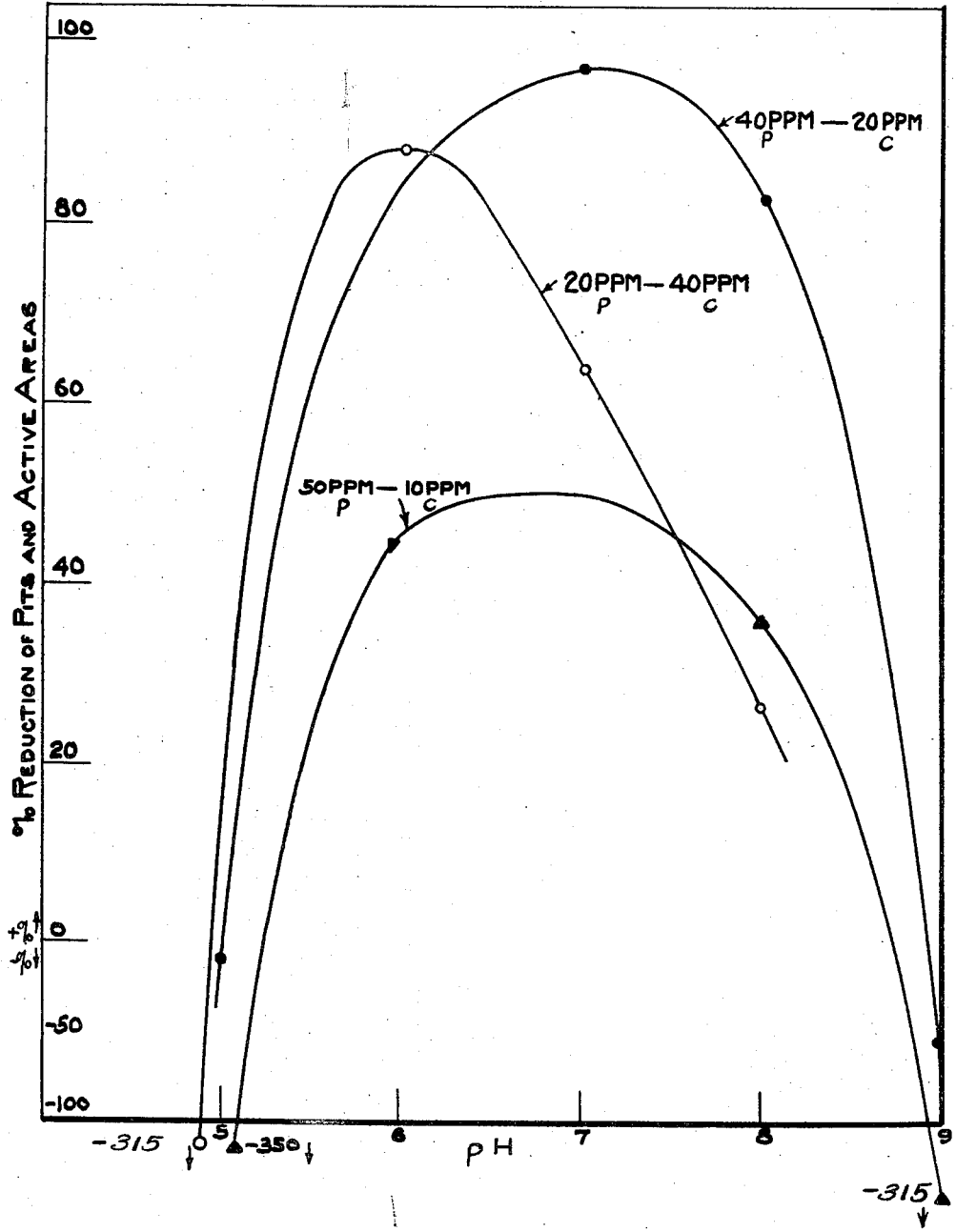

Metals, particularly ferrous metals and alloys and aluminum alloys, are subject to serious pitting and tuberculation in industrial water systems, causing work outage and costly replacements. Many available corrosion protective additives in industrial water systems reduce corrosion.

When reference is made herein to industrial water systems it is intended to include the wide variety of boiler, air-conditioning and industrial heat transfer systems used generally for cooling, heating or distributing water for industrial and process purposes.

Present practice in industrial water systems is to employ chromates in concentrations as low as 200 p. p. m. and in concentrations as high at 10,000 p. p. m., depending upon the protection needed and the permissible cost. Chromates are widely referred to in the literature and their effctiveness in reducing the rate of corrosion of ferrous metals is well known. Uhlig, Corrosion Handbook (1948), page 499, in a quotation from the American Chemical Society Symposium on Inhibitors for Aqueous Corrosion, 37 Industrial and Engineering Chemistry, 702–752, 1945, states "The tendency to pit when insufficient chromate is used may be reduced by occasional removal of rust tubercles. In old systems not previously inhibited it is desirable to start with about 500 p. p. m. (chromate) . . . The pH should be about 8.5 . . ." In most installations the cost imposes a limitation on the permissible concentration of chromate, so that the protection is not perfect and pitting and tuberculation occur to some extent, with accompanying reduction in water flow and perforation of piping.

In some industrial water systems, along with high chromate (of the order of 500 p. p. m.), phosphates have been added in the range of 1 to 10 p. p. m. for the control of calcium carbonate scale formation. If the calcium carbonate scaling tendency is too high for the phosphate to control, the alkalinity of the water is reduced slightly by acid. The chromate is used up to 1000 p. p. m. to reduce corrosion which is present whether or not the alkalinity is reduced by the acid. The phosphate used is usually a complex or molecularly dehydrated phosphate, although alkali metal ortho-phosphate may be used.

In the prior art corrosion protection has also been claimed for complex phosphate or ortho-phosphate alone in the range from 1 to 10 p. p. m., but plant results have been unsatisfactory in installations where the corrosion load is at all appreciable. These phosphates used in these concentrattions have been unable to give satisfactory corrosion protection. At the same time considerable pitting or localized corrosion has occurred in systems using such treatments. Hexameta-phosphate is commonly used in such treatments, and no adjustment of alkalinity is recommended.

Recently a high phosphate treatment has been recommended in which complex or molecularly dehydrated phosphate is used in a concentration of about 50 p. p. m., the pH of the water being adjusted to below the point where calcium phosphate precipitation can occur. This treatment is relatively new and has not performed well in practice.

Schlissell U. S. Patent No. 1,921,137 recommends incorporating silicates, caustic soda, tannins and minor proportions of phosphates and chromates to reduce corrosion, obtaining in his treatment a solution having 200 p. p. m. sodium silicate, 4 p. p. m. disodium phosphate, 2.9 p. p. m. sodium chromate or sodium dichromate, 1.6 p. p. m. caustic soda, 7.0 p. p. m. sodium carbonate, 0.01 p. p. m. tannin. The phosphate is intended to react with calcium and magnesium salts and deposit phosphates.

Many processes of pickling, metal cleaning and blackening of metals for corrosion protection employ chromates and phosphates together at high concentrations which would be inapplicable in industrial water treatments, with or without high acid concentrations and added ingredients such as manganese, zinc and organic catalysts.

I have discovered that when phosphate and chromate are used together in industrial water systems at moderately low concentrations in a controlled pH range, remarkable reduction in pitting and tuberculation results with good behavior from the standpoint of general corrosion. The results from the standpoint of improvement of pitting and tuberculation show in many cases a reduction of pits and active areas of over 80 percent when compared with chromate alone or phosphate alone at the same total concentration.

It is common knowledge that chromates and phosphates used alone can afford some degree of protection of ferrous metals in contact with water, the amount and type of general corrosion protection depending upon the conditions of use. Both, however, are anodic inhibitors which can cause considerable pitting and tuberculation if used alone in small concentrations. Van Brunt and Remsheid, General Electric Review 128 (1936) recommend that chromate be kept high in the range from 5,000 to 15,000 p. p. m., particularly if chlorides are high in concentration, as otherwise cells with large cathodes and small anodes will cause intense attack. Evans, Metallic Corrosion, Passivity and Protection (1946), page 535, states "given a sufficient concentration, these anodic inhibitors, chromates, phosphates, etc., are efficient. Unfortunately they are dangerous since if added in insufficient quantities to stop attack altogether corrosion is severely localized and the intensity of the attack enhanced so that perforations may occur more than if no inhibitor had been added."

The behavior of phosphate alone follows this same pattern in regard to pitting when concentration is under that level which will stop corrosion entirely. Hamer and Powell in a private communication to U. R. Evans state "the action of sodium hexameta-phosphate depends so much on the flow-rate and the amount added, and varies so much from one water to another that it is impossible to foretell its behavior in any given case, and it must be regarded as a somewhat unreliable inhibitor for general use. It belongs to the dangerous class of inhibitors, and causes pitting when present in inadequate quantity."

Since it is common knowledge that phosphates alone and chromates alone in low concentrations cause pitting and tuberculation as above indicated, the conjoint behavior of phosphates and chromates in preventing pitting and tuberculation is highly unobvious. These two anodic corrosion inhibitors when used together under the concentrations and in the pH range referred to herein have the power to reduce pitting and tuberculation remarkably over the behavior of either when alone in the same total concentration. They thus improve the results and save treatment additives, since it would be necessary to use much greater quantities of additives to obtain comparable results in eliminating pitting and tuberculation if reliance were placed on either chromate or phosphate alone.

I have discovered that for good results in the conjoint use of phosphate and chromate, the pH range should be from 5.25 to 7.8, preferably from 5.5 to 7.8 and most desirably from 5.8 to 7.4. The chromate employed should be in the concentration range from 5 to 188 p. p. m., preferably from 11 to 50 p. p. m. and most desirably from 15 to 25 p. p. m., the phosphate concentration should range from 11 to 194 p. p. m., preferably from 15 to 100 p. p. m. and most desirably from 30 to 50 p.p.m. For optimum results with very economical use of treatment additives, 20 p. p. m. chromate should be used with 40 p. p. m. phosphate. The total chromate and phosphate should range from 16 to 199 p. p. m., preferably from 26 to 150 p. p. m. and most desirably from 45 to 75 p. p. m.

Treatment in the proportions above will give very economical corrosion protection for iron (steel) and copper base alloys (copper, brass, bronze, etc.), which is much superior to that obtainable from far more expensive treatments using greatly increased quantities of additives.

The pH may be controlled by any suitable acidimetry or alkalimetry reagent, but as the pH recommended is in the range of 5.25 to 7.8 it will desirably be achieved by adding sulfuric acid, sodium acid sulphate, or other suitable reagent. For waters which are acidic, neutralization to the proper pH range can be accomplished by soda ash, caustic soda, sodium bicarbonate or other alkaline materials.

The phosphate will preferably be a complex or molecularly dehydrated phosphate, as I find that molecularly dehydrated phosphates are approximately 3 times as effective as ortho-phosphates. Any water soluble phosphate may be employed, preferably an alkali metal phosphate such as sodium, or potassium or ammonium phosphate. Whereas monosodium phosphate or monopotassium phosphate or phosphoric acid may be used or any ortho-phosphate, it is not preferred. The preferable molecularly dehydrated phosphates include sodium pyrophosphate, $Na_4P_2O_7$; sodium tripolyphosphate,

$Na_5P_3O_{10}$ sodium tetraphosphate, $Na_6P_4O_{13}$; sodium septaphosphate, $Na_9P_7O_{22}$; sodium decaphosphate, $Na_{12}P_{10}O_{31}$; and sodium hexametaphosphate, $Na_6P_6O_{18}$ or the corresponding potassium salts, or the molecularly dehydrated phosphoric acids such as metaphosphoric acid or pyrophosphoric acid, but any molecularly dehydrated phosphate composed of an $Na_2O:P_2O_5$ ratio from 1:1 to 2:1 can be employed.

The chromate can be incorporated into the water by adding a water soluble chromate or dichromate, preferably an alkali metal chromate or dichromate. Suitable chromates for use in the invention include sodium dichromate dihydrate, $Na_2Cr_2O_7.2H_2O$; sodium chromate anhydrous, $Na_2CrO_4$; sodium chromate tetrahydrate, $Na_2CrO_4.4H_2O$; sodium chromate hexahydrate,

$Na_2CrO_4.6H_2O$ sodium chromate decahydrate, $Na_2CrO_4.10H_2O$; potassium dichromate, $K_2Cr_2O_7$; potassium chromate $K_2CrO_4$, ammonium dichromate $(NH_4)_2Cr_2O_7$, and chromic acid $CrO_3$. In other words, the chromium compound used is any soluble hexavalent compound of chromium.

The chromate and phosphate can be added together as a briquette, made for example by molding together particles of the chromate and phosphate with any suitable binder, which forms no part of the present invention. The chromate and phosphate preferably form substantially the entire briquette and the lesser ingredient comprises at least 5 per cent of the total phosphate and chromate. The briquette will preferably include 66⅔ percent of phosphate and 33⅓ percent of chromate. Very good results are obtained by employing 10 to 82 percent of chromate with 18 to 90 percent of phosphate, and more desireably the chromate may be between 20 and 60 percent and the phosphate between 40 and 77 percent, based in each case on the total of chromate plus phosphate. The briquette can simply be brought in contact with the water of the industrial water system to dissolve the chromate and phosphate and the hydrogen ion concentration of the water system controlled either before or after the addition of the chromate and phosphate. The phosphate-chromate treatment may also be added as a powder or a solution to the water system.

EXPERIMENTAL WORK

*Test apparatus.*—In the experiments described below the apparatus was a continuous flow experimental water system divided into two sections, one section of specimens receiving the water having the inhibitor, and the other section of specimens receiving the untreated water. This system therefore allowed the testing of one control and one treatment experiment simultaneously, or two control or two treatment experiments. Each section received the same tap water from the municipal water sysem of Philadelphia, Pennsylvania, U. S. A., at the desired temperature and oxygen content, and each section was supplied with the desired ions and chemical additions by a separate pumping and feeding system. Downstream from the points of addition of the ions and chemicals, corrosion vessels were located for immersion of the corrosion specimens. The system allowed variation in the linear flow rate past the specimens between 0.02 and 2.5 feet per second. To simulate actual plant conditions in the experiments, three different types of plain carbon steel specimens were used; pipe and flat specimens to determine weight loss and for pit evaluation, and immersed pipe nipples for tuberculation studies on the threads. Specimens of copper base alloys such as copper and brass were also tested.

The flat specimens were high carbon steel having a composition of 0.9 percent carbon, 1.4 percent manganese, 0.04 percent sulphur, 0.3 percent silicon, no phosphorus, balance iron. The flat specimens before exposure were resurfaced using a #80 grinding wheel to a machining finish of R. M. S. 20 microinches to allow for accurate evaluation of pits. Before immersion the flat specimens were then cleaned with tripoli (an abrasive) followed by tri-sodium phosphate, alcohol rinse, dried and weighed. At 20 diameters the surface thus prepared was smooth without high polish, providing a good surface of counting pits and active areas. Ordinary hot or cold rolled steel surfaces were found to be too rough to permit evaluation of pitting.

The nipples of low carbon steel were prepared by degreasing and wire brushing the threads. The threads provided a very simple manner of studying tuberculation by visual examination after exposure.

The Philaldelphia municipal water used had an average anaylsis of 40 P. P. M. calcium as calcium carbonate, 20 P. P. M. magnesium as calcium carbonate, 25 P. P. M. alkalinity (methyl orange indicator) as calcium carbonate, 28 P. P. M. sulphate, 10 P. P. M. chloride, 1 P. P. M. silica and pH 6.6. In order to accelerate the corrosion, chloride was added to a total of 500 P. P. M. in the test water before it contacted the specimens. The oxygen in the test water was kept at 5 P. P. M. and the test water temperature was regulated to 120° F.

The system was automatic and could be run under regulated conditions for long periods of time without supervision. The total water used for each experiment was metered so that experiments in which any large variation in flow resulted, due to interruption of the municipal water supply or due to variation in the water flow from the water heating equipment, etc., could be disregarded.

After exposure the various specimens were subjected to visual microscopic inspection before and after cleaning. After cleaning the weight loss on the flat specimens was taken and the surfaces were examined for pits and active areas at 20 diameters magnification.

To aid in understanding the data presented, it should be noted at the outset that the characteristic chromate pits are mostly small, deep and aggressive, accompanied by large anodic areas, which are aggressive but not as deep. These large anodic areas are found when examined under the microscope to be colonies of very small pits closely associated and shallow, and are referred to herein as "active areas." "Active areas" permitted by the combination phosphate-chromate treatment are less aggressive and more shallow than those caused by chromate. In fact, the surface alteration in most cases is so slight that it hardly belongs in the pitting classification. The phosphate pit typically is a deep hole exhibiting little attack around the rim of the hole.

*pH Limitation of phosphate-chromate treatment.*—For most waters used in cooling and other industrial water systems, high concentrations of chromate alone in the range of 500 to 1000 p. p. m. give satisfactory corrosion protection. However, for many large plants, particularly oil companies using large volumes of water for cooling, it becomes prohibitively expensive to maintain such high concentrations. The make-up water requirements for many such installations are such that it becomes very costly to employ chromate in excess of 200 p. p. m. One of the great advantages of the phosphate-chromate treatment of the invention is that it permits operation with chromate concentrations below 200 p. p. m. while obtaining protection against general corrosion, pitting and tuberculation better than that previously obtained from chromate alone at considerably higher concentrations.

It is important to avoid precipitation of calcium phosphate by the reaction of complex phosphates or orthophosphates with calcium in the water under treatment, and therefore the pH of the water system should be kept below the pH of saturation of calcium phosphate. The pH of saturation of calcium phosphate for a given temperature, calcium and phosphate concentration can be calculated from data similar to that published by Green and Holmes, Journal American Water Works Association 1090 (1947).

Operating over the range of pH 4.9 to 9, the data plotted in Figure 1 were obtained comparing the percentage reduction in pits and active areas resulting from the phosphate-chromate treatment of the invention, as compared to the results from the same total quantity of chromate. The water used was Philadelphia tap water with chlorides increased to 500 p. p. m., at 120° F., flowing at a rate of 0.36 foot per second, and having a corrosivity of 0.1 inch penetration per year without inhibitor. The pH was adjusted by automatic addition of sulphuric acid. The tests were based on the flat specimens. The tests extended for one and two days. The total quantity of treatment in each case was 60 p. p. m., the basis of comparison being 60 p. p. m. of chromate alone, and each of the phosphate-chromate treatments involves a total concentration of 60 p. p. m., which consisted of 50 p. p. m. phosphate and 10 p. p. m. chromate in the case of one curve, 20 p. p. m. phosphate and 40 p. p. m. chromate in the case of a second curve, and 40 p. p. m. phosphate and 20 p. p. m. chromate in the case of a third curve. Thus with 40 p. p. m. of phosphate and 20 p. p. m. of chromate, at pH 6, the number of pits and active areas were reduced 80 percent whereas at pH 7 they were reduced 95 percent and at pH 8 they were reduced 85 percent compared to the pits and active areas obtained from 60 p. p. m. of chromate alone at each of these different pH levels. Thus in all cases over the pH range 6 to 8, less than 20 percent of the pits and active areas remain under the combined treatment compared to those resulting from the same concentration of chromate alone.

The phosphates employed were sodium decaphosphate, $Na_{12}P_{10}O_{31}$, and sodium tri-polyphosphate, $Na_5P_3O_{10}$, which were found to give substantially the same results, and the chromates employed were sodium chromate and sodium dichromate which likewise gave the same results.

As pH 5 was approached on one end of the curves and as pH 9 was reached on the other end of the curves, the combined phosphate-chromate treatment lost its power of preventing pitting and active areas, and as will be noted from the ordinates below zero, it acquired a negative protective character harmfully increasing pitting to a very high degree at lower and higher pH's. It will be seen later that the results between pH 8 and 9 are better when compared with chromate alone than when compared with phosphate alone. It is thus seen that the range between pH 5.25 and pH 7.8 is critical and that the treatment is desirable to prevent pitting and tuberculation in this specific range.

It will be evident that the same limits of pH range apply for different ratios of phosphate and chromate in Figure 1.

When ortho-phosphates are used instead of molecularly dehydrated or complex phosphates, there is some loss in efficiency, monosodium phosphate producing about one-third the reduction of pits and active areas as that obtained from molecularly dehydrated phosphates. Mixtures of ortho-phosphates and molecularly dehydrated phosphates, however, offer much of the advantage of molecularly dehydrated phosphates out of proportion to the quantity of molecularly dehydrated phosphate present. For example, a mixture of 20 p. p. m. of monosodium phosphate; 20 p. p. m. of sodium decaphosphate and 20 p. p. m. of sodium chromate, gave 95 percent as high a reduction in percentage of pits and active areas when compared with 60 p. p. m. of chromate as did 40 p. p. m. sodium decaphosphate and 20 p. p. m. sodium chromate (incidentally the effect was similar when compared to phosphate alone, as 20 p. p. m. monosodium phosphate, 20 p. p. m. sodium decaphosphate and 20 p. p. m. of sodium chromate gave 99 percent as high a reduction in percentage of pits and active areas as did 40 p. p. m. sodium decaphosphate and 20 p. p. m. sodium chromate when compared to 60 p. p. m. sodium decaphosphate alone).

The best results as compared to 60 p. p. m. chromate alone were obtained from 40 p. p. m. phosphate and 20 p. p. m. chromate as far as pit reduction was concerned, and this composition gave the broadest pH plateau for high pit reduction when compared with chromate alone.

The protective treatment employing 20 p. p. m. of phosphate and 40 p. p. m. of chromate afforded slightly less reduction in pitting and gave a slightly narrower pH range when compared to chromate alone. The treatment employing 50 p. p. m. of phosphate (molecularly dehydrated) and 10 p. p. m. of chromate was less effective than the other two ratios shown on Figure 1 and covers the same pH range as 20 p. p. m. phosphate (molecularly dehydrated) and 40 p. p. m. chromate.

The aggravation of corrosion above pH 9 would appear to be in line with theoretical considerations. Above pH 9, cathodic control is starting to add protection to the anodic control for chromate alone and thus the benefit of the phosphate-chromate treatment should diminish. Below pH 5 as free mineral acid is being approached, the pitting tendency with chromate alone vanishes into general attack of the metal as the anodic corrosion products become more soluble. Therefore the benefits of pitting reduction from the composite phosphate-chromate treatment cease. The chromate pits are mostly small, deep and aggressive, accompanied by large anodic areas, which are aggressive but not as deep. These large active areas when studied under the microscope are found to be colonies of very small pits which are very close together and quite shallow. The small, deep aggressive pits have tall tubercles on top of them while the large active areas were completely covered by corrosion products which were far less thick than those at the deep pits.

When compared to chromate alone, the phosphate-chromate treatment as shown in the data of Figure 1 gave excellent reduction in pits. At the level of concentration used, the phosphate-chromate treatment was incapable of stopping all-out attack by this very corrosive water but the relatively few pits that remained were very shallow and seemingly non-aggressive, with very minute corrosion products on them. The fact that this combination treatment could alter the character of the pit is important because otherwise a reduction of pitting normally would lead to an intensification of attack because the amount of metal must be lost over a smaller area. The phosphate-chromate treatment not only reduced the percentage of pits but altered the nature of the attack on the steel so that it could not properly be called a pit as it had little depth and large area and as time progressed became less active, suggesting that over a longer period of time the surface alteration would be healed.

Figure 2:
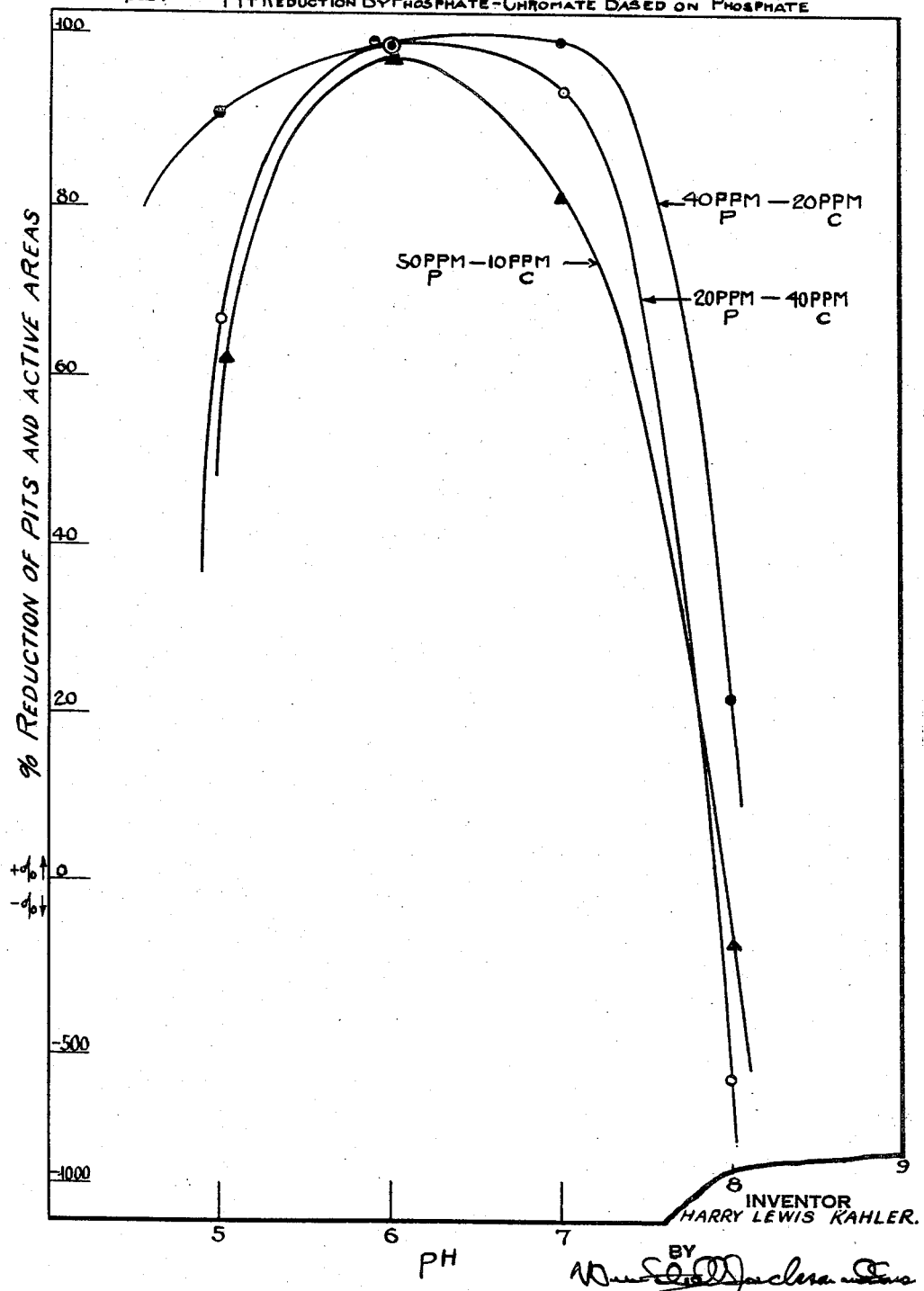
Figure 2 shows the reduction in pits and active areas by the phosphate-chromate treatment of the invention compared with that obtained by phosphate alone, and plots the percentage reduction of pits and active areas as ordinates plus or minus, against the pH as abscissae.

Thereas Figure 1 illustrates the effect of the phosphate-chromate treatment over various pH values as compared with chromate alone, Figure 2 gives the results as compared to 60 p. p. m phosphate alone over a similar pH range. Figure 2 plots the same data for the phosphate-chromate treatment as that of Figure 1 but compares the data to that obtained on 60 p. p. m. molecularly dehydrated phosphate alone. Because complex and ortho-phosphates alone both pit steel so viciously, the controls used in Figure 2 showed very bad pitting, and the phosphate-chromate treatment correspondingly exhibits a higher percentage reduction of pits and active areas. For example at pH 5, 6, 7 and 8, 60 p. p. m. molecularly dehydrated phosphate alone gave results of 6300, 11,600, 5180 and 45 pits per square inch of surface respectively. The physical attributes of the phosphate pit after cleaning are different from those of the chromate pit in that the phosphate produces a deep clean hole with little attack around the rim of the hole. Before cleaning the phosphate pit will have a tubercle over it but its height will not be proportional to the depth of the pit as the phosphate treatment appears to clean away part of the tubercle as it forms leaving less corrosion products and less tuberculation than in the case of the chromate alone. The majority of the phosphate pits under the condition of test were deep enough to give a maximum penetration of up to 0.9 inch of steel per year (a tremendous penetration rate).

It will be observed that in Figure 2 the phosphate-chromate treatment for 50 p. p. m. phosphate and 10 chromate, 40 p. p. m. phosphate and 20 p. p. m. chromate and 20 p. p. m. phosphate and 40 p. p. m. chromate in each case gave a high average percentage of reduction of pits at pH 5, 6 and 7 (better than 90 percent) tapering off drastically at pH 8 and tapering off more slowly at pH below 5. Again as in the case of chromate alone the combined phosphate-chromate treatment not only drastically reduced the number of pits and active areas, but the character of the pits was changed from vicious deep pits resulting from phosphate alone to large shallow non-active areas for phosphate-chromate, which areas became less aggressive as time went on.

While the results on aluminum base alloys and on copper base alloys such as copper and brass were less extensive than those on steel, they indicated that protection of the same character was obtained against pitting and tuberculation.

Comparing Figures 1 and 2, it will be observed that the combined results from comparing the phosphate-chromate treatment of the invention with chromate alone and with phosphate alone indicate that the treatment according to the invention is beneficial within the pH range of 5.25 to 7.8, but the results obtained are better within the pH range of 5.5 to 7.8 and the best results, all things considered, are obtained within the pH range of 5.8 to 7.4.

Outside the pH range of 5.25 to 7.8 the treatment of the invention is not only not to be recommended, but clearly is positively harmful from the standpoint of protection from pitting and tuberculation.

*Prevention of tuberculation by phosphate-chromate treatment.*—Low carbon steel nipples were exposed under conditions of Figures 1 and 2 at a water flow rate of 0.5 feet per second, permitting an excellent opportunity to study tuberculation. For example, using the protective treatment 40 p. p. m. phosphate and 20 p. p. m. chromate at pH 6, the nipple threads showed little or no rust products or tuberculations, and at pH 7 the results were almost as good, based on exposures of one and two days.

At pH 8 the phosphate-chromate treatment of the invention started to lose its power to keep the threads clean, and at pH 9 the protective power was completely lost and the threads were full of rust and large tuberculations.

Comparing these results with Figure 1, it will be seen that the prevention of tuberculation was a function of the same pH range as the prevention of pits, which would be expected from theory since pitting causes tuberculation. Wherever there was a drastic reduction in the percentage of pits there was a corresponding reduction in the amount of tuberculation. At pH 5.25, 6, 7 and 7.8, the 40 p. p. m. phosphate and 20 p. p. m. chromate treatment was superior from the standpoint of tuberculation to the 60 p. p. m. chromate treatment over the same pH range. At pH 9 the phosphate-chromate treatment of the invention had nothing to offer over the chromate treatment alone. At pH below 6, the phosphate-chromate treatment was only slightly better than the chromate alone, indicating that the tuberculation protection was fading out, and at pH below 5.25 the tuberculation improvement from the phosphate-chromate treatment over the chromate had been lost.

When compared with phosphate alone, the benefit from the phosphate-chromate treatment of the invention in preventing tuberculation is not as marked as it was when compared with chromate alone, although the phosphate-chromate treatment of the invention has an advantage which is most pronounced at pH 5.8 to 7.4. The tuberculation advantage of the duplex treatment over the single treatment is not as pronounced because the phosphate alone is able to clean away some of the tuberculation formations in somewhat the same way that it functions in the combined treatment. At pH 8, the phosphate alone, like the phosphate-chromate treatment, begins to lose its power of clearing away the corrosion products and tubercles. At pH 9 neither the phosphate alone nor the phosphate-chromate treatment prevents tubercles as the threads are full of rust and corrosion products. At pH 5.5 and 5.0 the prevention of tuberculation by phosphate alone is good and the phosphate-chromate treatment of the invention has very little advantage over it from the standpoint of tuberculation. At pH below 5 the advantage of the duplex treatment is lost completely from the standpoint of tuberculation. Thus the tuberculation prevention by the phosphate-chromate treatment follows a pattern rather similar to that of phosphate alone, and the advantage of the combined treatment is only substantial in the pH range of 5.8 to 7.4 or 5.5 to 7.8 at best.

Figure 3:
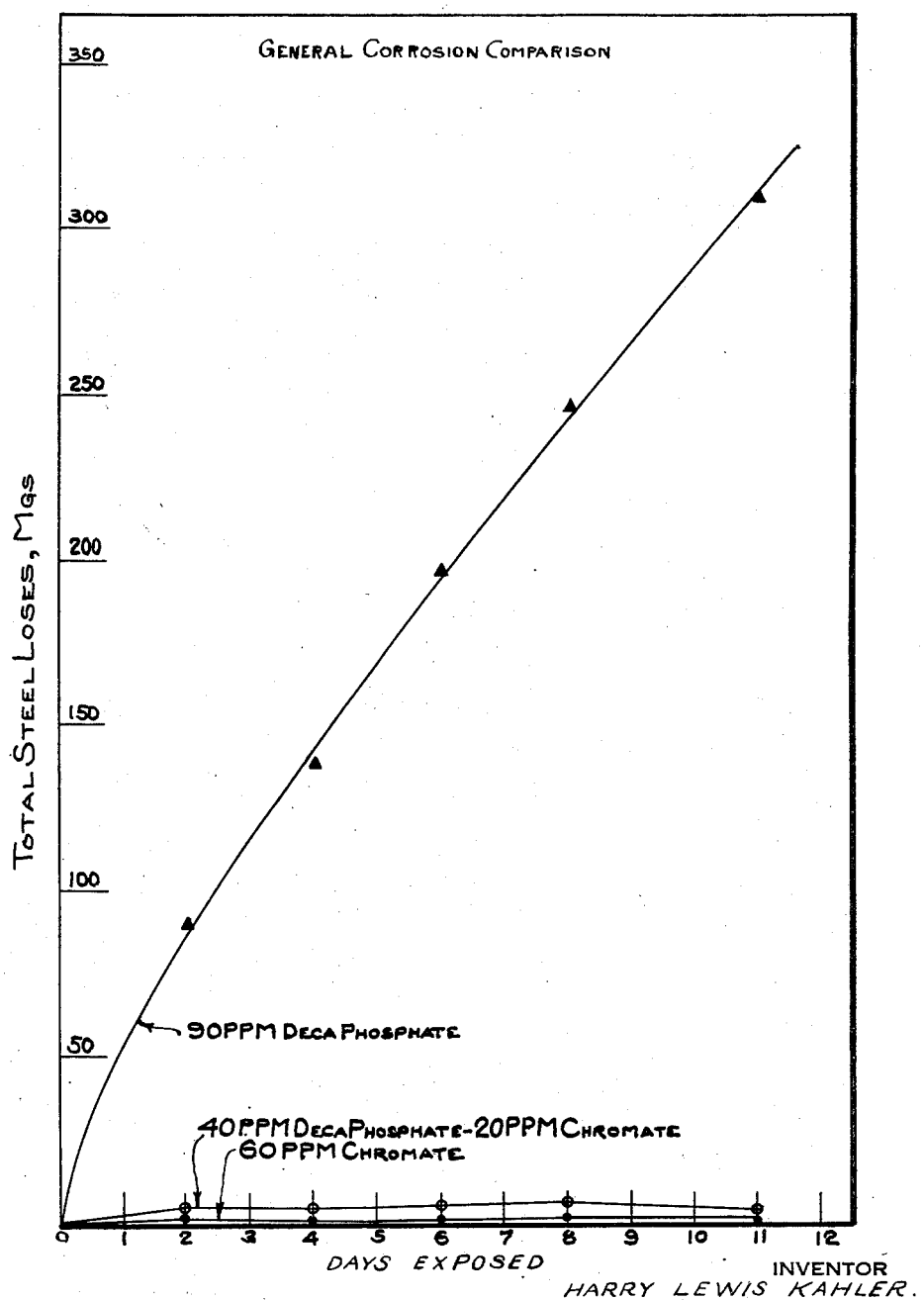
Figure 3 shows the comparison between the phosphate-chromate treatment of the invention, and chromate alone and phosphate alone from the standpoint of general corrosion, and plots total steel losses in milligrams as ordinates against days of exposure as abscissae.

*Effectiveness of phosphate-chromate treatment against general corrosion as compared to chromate or phosphate single treatments.*—The discovery that the combination of the two anodic treatments, phosphate and chromate in the advantageous pH range, will reduce tuberculation and pitting does not carry with it any disadvantage from the standpoint of control of general corrosion. Figure 3 shows that the phosphate-chromate treatment is as effective against general corrosion or loss of steel as the chromate treatment alone and far superior to the phosphate treatment alone. The curve for 40 p. p. m. sodium decaphosphate and 20 p. p. m. sodium chromate follows substantially the same pattern as the curve for 60 p. p. m. sodium chromate, while the curve for 90 p. p. m. sodium decaphosphate alone (the increase in concentration giving the phosphate alone an advantage in the comparison) slopes off only slightly in the first four days and after the fourth day assumes a straight line function corresponding to a high constant loss of steel with time.

The table shows the same data for a continuous flow system using Philadelphia tap water at pH 6 to 7 with a flow rate of 0.36 foot per second and at 120° F.

TABLE

*Differential losses of three corrosion treatments—Flat steel specimens*

| Treatment, p. p. m. | Total Steel Losses, Mgs. | Days Exposed | Differential Losses, Mgs. time |
|---|---|---|---|
| 90 p. p. m. Decaphosphate | 90 | 2 | |
| Do | 139 | 2 | 49 mgs./2 days. |
| Do | 198 | 6 | 59 mgs./2 days. |
| Do | 247 | 8 | 49 mgs./2 days. |
| Do | 306 | 11 | 59 mgs./3 days. |
| 60 p. p. m. Sodium Chromate | 1 | 2 | |
| Do | 1 | 4 | 0 mgs./2 days. |
| Do | 1 | 6 | 0 mgs./2 days. |
| Do | 2 | 8 | 1 mgs./2 days. |
| Do | 2 | 11 | 0 mgs./3 days. |
| 40 Decaphosphate-20 Chromate | 5 | 2 | |
| Do | 5 | 4 | 0 mgs./2 days. |
| Do | 6 | 6 | 1 mgs./2 days. |
| Do | 7 | 8 | 1 mgs./2 days. |
| Do | 4 | 11 | 0 mgs./3 days. |

This table shows that the differential losses of the phosphate-chromate treatment are no higher than the chromate alone after the first day. The phosphate treatment alone, on the other hand, gives 30 to 50 times the steel losses of the other two treatments and these losses became constant showing that no appreciably lower losses are to be expected as time goes on. Thus the phosphate-chromate treatment has the power to save as much steel as the chromate treatment alone and nothing in the way of steel saving power is sacrificed by using the combined treatment to obtain reduced pitting and tuberculation. By the eleventh day the phosphate treatment has allowed an average penetration of 0.026 inch per year while the phosphate-chromate treatment and the chromate treatment alone respectively have allowed only 0.00036 and 0.00015 inch per year. This water without treatment has a corrosion load of 0.07 inch per year average penetration.

Figure 4:
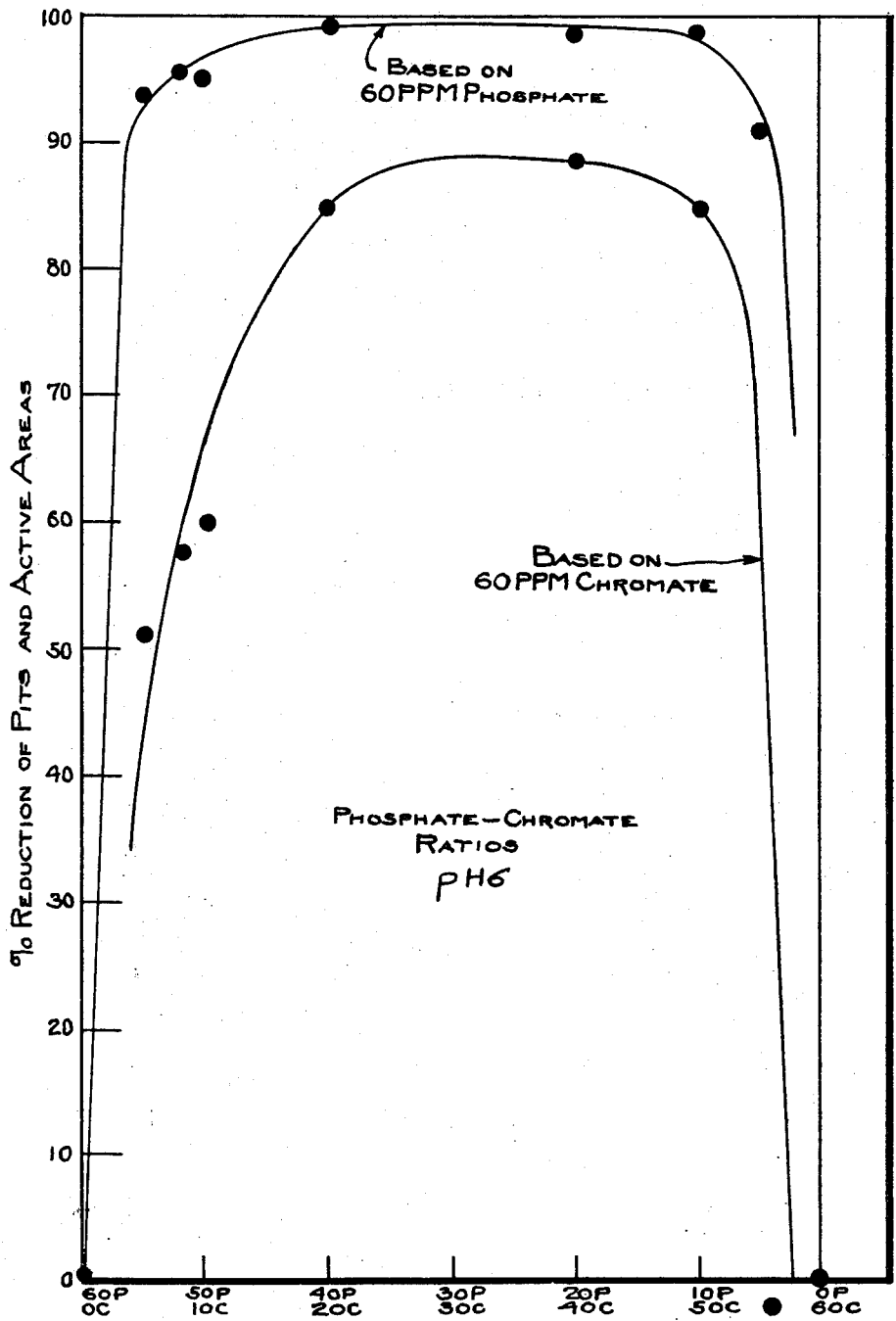
Figure 5:
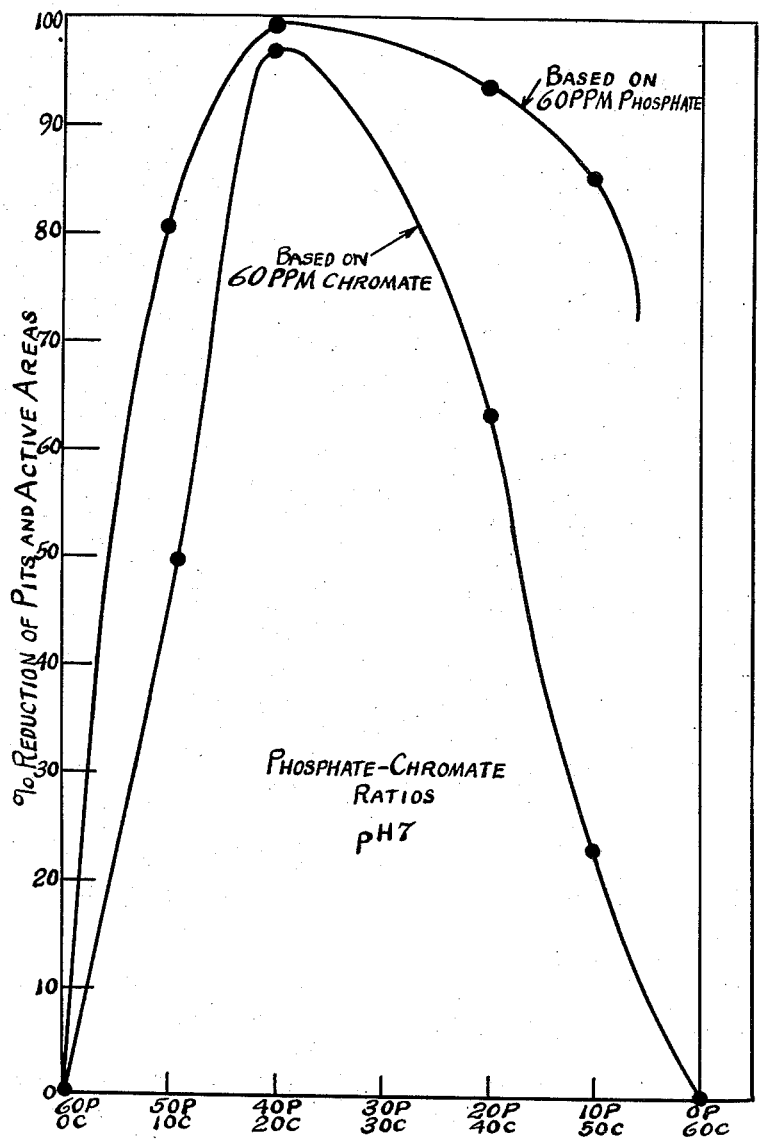

*Concentration limitation of phosphate-chromate treatment.*—As shown by Figures 4, 5 and 6, the phosphate-chromate treatment has limitations imposed by concentration as well as those imposed by pH. Figure 4 plotted for pH 6 shows that 60 p. p. m. of total treatment, the combined phosphate-chromate treatment reduced pits and active areas very pronouncedly over an intermediate range of phosphate and chromate, but the benefit dropped off markedly at low concentrations of chromate at one end and of phosphate at the other end. As the low concentrations of either ingredient were approached, the results dropped off quite abruptly compared to those of the single treatment. The broadest concentration range for any of the acceptable pH values was obtained at pH 6 shown in Figure 4.

In Figure 5, plotted for pH 7, the treatment ratio region based on chromate was not as broad in the high percent improvement zone but broadened out at lower percentages of improvement. The curve based upon phosphate alone was broader in the high percentage of improvement at pH 7. Again at pH 7 the effectiveness of the posphate-chromate treatment diminished sharply at the limits of low phosphate or low chromate.

Figure 6, plotted for pH 8, shows a breadth of improvement based on chromate alone which is about like that of pH 7. The curve based on phosphate, however, shows less marked improvement, and the main advantage is found in the center of the treatment ratio region.

The results of Figures 4, 5 and 6 are obtained for 60 p. p. m. of total treatment. Similar results may be obtained for other total treatments. For example, the work done a 40 p. p. m. total treatment gave approximately the same results.

In the higher concentration ranges the following results are typical. At pH 6, 50 p. p. m. of sodium decaphosphate—150 p. p. m. of sodium chromate; 100 p. p. m. of sodium decaphosphate—100 p. p. m. of sodium chromate; and 150 p. p. m. of sodium decaphosphate—50 p. p. m. of sodium chromate gave respectively 61 percent, 68 percent and 89 percent reduction in pits and active areas compared with the results from 200 p. p. m. sodium chromate alone. As compared with 200 p. p. m. sodium decaphosphate alone, the respective reductions in pits and active areas were 92 percent, 94 percent and 98 percent. Corresponding reductions in tuberculation were obtained. The conditions of test were similar to those previously discussed in connection with Figures 1 and 2. Given a choice of treatment distribution, the best selection favors higher phosphate and lower chromate, with a two phosphate to one chromate ratio by weight as a good practical guide.

Considering the entire pH range of 5.25 to 7.8 in which benefit is obtained from the combined phosphate-chromate treatment when compared with phosphate alone and also chromate alone, it would appear that the chromate range may vary from 5 to 188 p. p. m. and the phosphate range from 11 to 194 p. p. m., with the total chromate plus phosphate in the range from 16 to 199 p. p. m. Where optimum results regardless of economy are important, the highest concentrations within the ranges mentioned are recommended. For many installations where economy is important along with good results, the recommended chromate range is 11 to 50 p. p. m. and the phosphate range is 15 to 100 p. p. m. with a total chromate plus phosphate range of 26 to 150 p. p. m., employing in all cases a pH range of 5.25 to 7.8. The best results consistent with maximum economy are secured using a chromate range of 15 to 25 p. p. m. and a phosphate range of 30 to 50 p. p. m., with a total chromate plus phosphate of 45 to 75 p. p. m. While other ratios of phosphate to chromate may be employed, it has been found that the maximum power to reduce pitting and tuberculation is obtained by employing a ratio of phosphate to chromate of 2 to 1. The above concentration ranges apply also to the pH range of 5.5 to 7.8, which is preferable to the broader range.

Naturally the lower concentration ranges give better results at lower corrosion loads, such as loads of the order of 0.02 inch per year average penetration.

*Plant results.*—The principles of the present invention have been applied in plant scale experiments, and have adequately confirmed the outstanding results secured in this pilot plant research. Plant personnel report a vast reduction in the replacement of pipe and equipment, and observation of equipment indicates reduced pitting and tuberculation over chromate and phosphate treatments alone, having the same total concentration of additives.

CONCLUSION

It is difficult on the basis of the data accumulated thus far to formulate a theory for the marked improvement obtained by using chromate and phosphate together in industrial water systems. While the present application is not based upon the validity of this theory, the following explanation would appear to be supported by the results thus far obtained. The phosphate cleans away corrosion products from the surface of the clean or the corroded metal as they form. By thus removing corrosion products, the phosphate permits the chromate to maintain constant contact with all surfaces, even active areas, and maintain protection. The absence of tuberculation avoids the formation of concentration cells which would otherwise accelerate pitting. Because this phosphate-chromate treatment eliminates both the chromate and phosphate types of pits by changing their character, it is believed that the two anodic inhibitors exhibit a different mechanism when used together than when used alone.

It will be evident that by the invention two anodic treatments are combined under favorable conditions of pH to provide protection for iron, steel, aluminum and copper base alloys from water in industrial water systems. While the results from the invention are not unfavorable from the standpoint of general corrosion, the benefit obtained is most pronounced in respect to pitting and tuberculation.

The invention provides a very simple treatment which combines pH control with addition to the water of both phosphate and chromate. It will be evident that the phosphate used will preferably be alkali metal molecularly dehydrated phosphate, although ortho-phosphate may be employed. The chromate may be introduced in the form of alkali metal chromate or dichromate.

Unless otherwise indicated the percentages herein are by weight.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. The process of treating water in a water system to protect against pitting and tuberculation of metal, which comprises regulating the pH of the water to a range of 5.25 to 7.8, and maintaining in the water from 5 to 188 p. p. m. of water soluble chromate and from 11 to 194 p. p. m. of water soluble phosphate, the total chromate plus phosphate concentration being from 16 to 199 p. p. m. calculated as water soluble chromate plus phosphate.

2. The process of treating water in a water system to protect against pitting and tuberculation of metal, which comprises regulating the pH of the water to a range of 5.25 to 7.8 and maintaining in the water from 5 to 188 p. p. m. of alkali metal chromate and from 11 to 194 p. p. m. of alkali metal molecularly dehydrated phosphate, the total chromate plus phosphate concentration being from 16 to 199 p. p. m. calculated as alkali metal chromate plus phosphate.

3. The process of treating water in a water system to protect against pitting and tuberculation of metal, which comprises regulating the pH of the water to a range of 5.25 to 7.8, and maintaining in the water from 5 to 188 p. p. m. of alkali metal chromate and from 11 to 194 p. p. m. of alkali metal orthophosphate, the total chromate plus orthophosphate concentration being from 16 to 199 p. p. m. calculated as alkali metal chromate plus phosphate.

4. The process of treating water in a water system to protect against pitting and tuberculation of metal, which comprises regulating the pH of the water to a range of 5.5 to 7.8 and maintaining in the water from 5 to 188 p. p. m. of alkali metal chromate and from 11 to 194 p. p. m. of alkali metal molecularly dehydrated phosphate, the total chromate plus phosphate concentration being from 16 to 199 p. p. m. calculated as alkali metal chromate plus phosphate.

5. The process of treating water in a water system to protect against pitting and tuberculation of metal, which comprises regulating the pH of the water to a range of 5.5 to 7.8, and maintaining in the water from 5 to 188 p. p. m. of alkali metal chromate and from 11 to 194 p. p. m. of alkali metal ortho-phosphate, the total chromate plus ortho-phosphate concentration being from 16 to 199 p. p. m. calculated as alkali metal chromate plus phosphate.

6. The process of treating water in a water system to protect against pitting and tuberculation of metal, which comprises regulating the pH of the water to a range of 5.25 to 7.8, and maintaining in the water from 11 to 50 p. p. m. of alkali metal chromate and from 15 to 100 p. p. m. of alkali metal molecularly dehydrated phosphate, the total chromate plus phosphate concentration being from 26 to 150 p. p. m. calculated as alkali metal chromate plus phosphate.

7. The process of treating water in a water system to protect against pitting and tuberculation of metal, which comprises regulating the pH of the water to a range of 5.25 to 7.8, and maintaining in the water from 15 to 25 p. p. m. alkali metal chromate and from 30 to 50 p. p. m. of alkali metal molecularly dehydrated phosphate.

8. An industrial water of reduced tendency to pit and tuberculate metal, having a pH in the range between 5.25 to 7.8 and containing 5 to 188 p. p. m. of water soluble dissolved chromate and from 11 to 194 p. p. m. of water soluble dissolved phosphate, the total chromate plus phosphate concentration being from 16 to 199 p. p. m. calculated as alkali metal chromate plus phosphate.

9. An industrial water of reduced tendency to pit and tuberculate metal, having a pH in the range from 5.5 to 7.8, having a concentration of water soluble dissolved chromate of from 11 to 50 p. p. m. and having a concentration of water soluble dissolved molecularly dehydrated phosphate of 15 to 100 p. p. m., the total chromate plus phosphate concentration being from 26 to 150 p. p. m. calculated as alkali metal chromate plus phosphate.

10. An industrial water of reduced tendency to pit and tuberculate metal, having a pH in the range from 5.5 to 7.8, having a concentration of water soluble dissolved chromate from 11 to 50 p. p. m. and having a concentration of water soluble dissolved orthophosphate of 15 to 100 p. p. m., the total chromate plus orthophosphate concentration being from 26 to 150 p. p. m. calculated as alkali metal chromate plus phosphate.

11. An industrial water of reduced tendency to pit and tuberculate metal, having a pH of 5.8 to 7.4, having a concentration of water soluble dissolved chromate from 15 to 25 p. p. m. and having concentration of water soluble dissolved molecularly dehydrated phosphate of 30 to 50 p. p. m.

References Cited in the file of this patent

UNITED STATES PATENTS

| | | |
|---|---|---|
| 1,613,656 | Hall | Jan. 11, 1927 |
| 1,734,706 | Adler | Nov. 5, 1929 |
| 1,962,821 | Kochs | June 12, 1934 |
| 1,997,256 | Hall | Apr. 9, 1935 |
| 2,208,101 | Michel | July 16, 1940 |
| 2,315,995 | Williams | Apr. 6, 1943 |

OTHER REFERENCES

Ind. Eng. Chem., vol. 37, pp. 741–9, 1945.